(12) United States Patent
Sugaya et al.

(10) Patent No.: US 6,678,502 B1
(45) Date of Patent: Jan. 13, 2004

(54) WIRELESS TRANSMITTING METHOD, WIRE TRANSMITTING METHOD, WIRELESS TRANSMITTER AND WIRED TRANSMITTER

(75) Inventors: Shigeru Sugaya, Kanagawa (JP); Hidemasa Yoshida, Chiba (JP); Hisaki Hiraiwa, Kanagawa (JP)

(73) Assignee: Sony Corporation, Tokyo (JP)

(*) Notice: Subject to any disclaimer, the term of this patent is extended or adjusted under 35 U.S.C. 154(b) by 575 days.

(21) Appl. No.: 09/667,163

(22) Filed: Sep. 21, 2000

(30) Foreign Application Priority Data

Sep. 22, 1999 (JP) .......................... P11-268973

(51) Int. Cl.[7] .................. H04L 12/28; H04L 12/56; H04L 29/06; H04L 1/00
(52) U.S. Cl. .................. 455/74.1; 370/338; 370/466; 714/776
(58) Field of Search .................. 714/776; 370/338, 370/466; 455/74.1, 561, 41.2, 41.3

(56) References Cited

U.S. PATENT DOCUMENTS 5,699,365 A  12/1997  Klayman et al.

FOREIGN PATENT DOCUMENTS

WO  9914963  3/1999

*Primary Examiner*—Vivian Chin
*Assistant Examiner*—Raymond B. Persino
(74) *Attorney, Agent, or Firm*—Jay H. Maioli (57) ABSTRACT

A wireless transmitting method capable of simplifying a transmission packet. In which error correction codes C11 to C16 added to data information (FIG. 4A) sent from various equipments connected through a high-speed serial bus are removed to convert the data information into data information (FIG. 4B) in a predetermined wireless environment, and error correction codes C21 to C24 are added to the data information (FIG. 4B) in the predetermined wireless environment thus converted as shown in FIG. 4C for transmitting by wireless as shown in FIG. 4D.

20 Claims, 13 Drawing Sheets

FIG. 1

L1 to L4 Cable
104 Wireless Transmitter (Control Station)
101 to 103 Wireless Transmitter (Terminal Communication Station)

| Packet ID | Destination ID | Source ID | Continuos Flag | Sequence Number | Valid Time Information |
|---|---|---|---|---|---|

WIRELESS TRANSMITTING METHOD, WIRE TRANSMITTING METHOD, WIRELESS TRANSMITTER AND WIRED TRANSMITTER

BACKGROUND OF THE INVENTION

1. Field of the Invention

The present invention relates to a wireless transmitting method, a wired transmitting method, a wireless transmitter and a wired transmitter.

2. Description of the Related Art

As a method of transmitting data having a comparatively large amount of information such as digital image data, program data for a computer, or file data for a computer, and the like between a plurality of equipments, a method of utilizing an IEEE 1394 high-speed serial bus interface has heretofore been developed. In the data transmission utilizing the IEEE 1394 high-speed serial bus interface, a plurality of equipments for carrying out the data transmission are connected to each other through a serial bus having a predetermined standard, and data of packet structure are transmitted to a desirable partner equipments apparatus through the serial bus.

In the data transmission utilizing the IEEE 1394 high-speed serial bus interface, two transmission modes are prepared, newly, an isochronous transmission mode in which data having a comparatively large amount of data such as the image data are transmitted on a continuous time basis and asynchronous transmission mode ( asynchronous transmission mode) in which data having a comparatively small amount of information such as control data are reliably transmitted at random.

By performing the data transmission utilizing the IEEE 1394 high-speed serial bus interface, various data can be transmitted to an optional partner connected through the serial bus line.

OBJECT AND SUMMARY OF THE INVENTION

In general, a wireless transmission frame is defined in a greater unit (for example, a unit of 4 msec) than the transmission cycle in a cable environment (approximately a unit of 125 μsec). Since a processing of converting data information into the transmission signal form of a wireless environment and other modem processings require some time, the wireless transmission frame can't help being defined by the time required for the operation of various controllers. For this reason, it is hard to carry out the wireless transmission without converting the data information in a cable (wired) environment into the data information in a wireless environment.

Conventionally, there has been considered a method of forming a packet transmitted in the cable environment including an error correction code portion, etc. into the packet in the wireless environment. However, the error correction code portion included in the packet sent in the cable environment is redundant for performing of the wireless transmission.

Depending on the circumstances, it has become necessary to carry out a processing of modifying the contents of the packet sent in the cable environment. In this case, therefore, there has been a possibility that the error correction code in the cable environment might be insignificant.

Specifically, when the wired transmission line is bridged (data information sent on the wired transmission line is passed through a wireless transmission path are returned again to the wire transmission line), there is a possibility that the information contents described in destination information may not represent actual destination information. Therefore, it is necessary to rewrite the destination information into correct information. On that occasion, the error correction code should be re-added.

Furthermore, there has been used a method of resending the wireless packet in order to ensure the transmission in a wireless interval. However, it has been necessary to similarly define the allowable time of delay generated by the resending and the number of times of resending on the transmitting and receiving sides.

The object of the present invention aims to provide a wireless transmitting method capable of simplifying the wireless transmission data information.

As a another object of the present invention aims to provide a wire transmitting method capable of easily modifying the contents of the transmitted packet.

Also, another object of the present invention aims to provide wireless transmitting method in which the transmitting side of the wireless transmission can decide a time required before the resending of the data information and can notify the wired side of the fact that the connection between wireless transmitters is unstable and so the transmission cannot be carried out.

Further, another object of the present invention aims to provide a wired transmitting method and apparatus in which the receiving side of the wireless transmission can make invalid the wireless data information having a valid time passed on, thereby allowing no transmission to the wired transmission line.

The present invention provides a wireless transmitting method for converting data information transmitted from an apparatus connected through a wire transmitting path into wireless data information and transmitting the wireless data information, in which an error correction code added to the data information is removed and the data information is converted into predetermined wireless data information, header information is added to the predetermined wireless data information thus converted and the error correction code is added to the data information to be transmitted by wireless.

The present invention provides a wireless transmitting method for converting data information transmitted from an apparatus connected through a wire transmitting path into wireless data information and transmitting the wireless data information, in which an error correction code added to the data information is removed and the data information is converted into predetermined wireless data information, header information is added to the predetermined wireless data information thus converted and the error correction code is added to the data information to be transmitted by wireless.

Moreover, the present invention provides a wire transmitting method for converting data information received by wire transmitting means into wire data information and transmitting the wire data information, in which an error correction code added to the data information is removed and the data information is converted into predetermined wire data information, wire header information is extracted from the predetermined wire data information thus converted, and the error correction code is added to the data information to be transmitted to an apparatus connected through a wire transmission path.

DESCRIPTION OF THE PREFERRED EMBODIMENTS

An embodiment according to the present invention will schematically be described below. An error correction code portion included in the packet of data information transmitted in a cable (wired) environment is removed to build a packet in a wireless environment, and its own original error correction code is added to the packet in the wireless environment, so that wireless transmission is carried out.

In the wireless transmitter receiving the packet in the wireless environment of the data information, moreover, the error correction code in the wireless environment is removed to build a packet in a cable environment, and an error correction code in the cable environment is added to the packet in the cable environment for the transmission by wire.

When a plurality of transmission lines are bridged in the middle of a packet converting process, (the data information transmitted transmission line is through a plurality of other transmission lines and returned on a certain original certain transmission line ), a processing to change destination information is carried out as needed.

Furthermore, the valid time of the packet is herein set to the packet transmitted in the cable environment, and the valid time information is added to the packet in the wireless environment for the wireless transmission.

On the receiving side, reference is made to the valid time information and the wireless packet received after the valid time passes is made invalid.

On the transmitting side, reference is also made to the valid time information, and the resending is not carried out after the valid time passes, but a packet non-delivery notice is given to the cable environment.

Referring to the drawings, a specific example of the embodiment according to the present invention will be described below in detail. First of all, description will be given to a wireless network system as the specific example with reference to FIG. 1.

Figure 1:
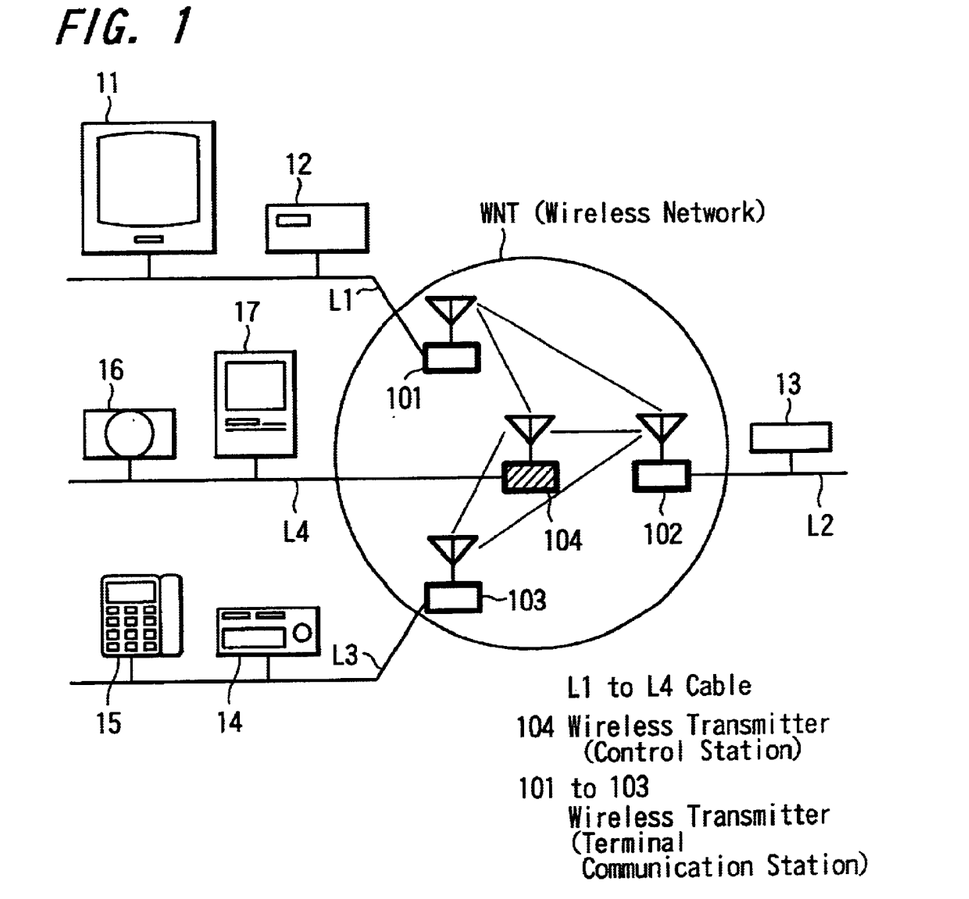
FIG. 1 is a block diagram showing a wireless network system an embodiment according the present invention.

In FIG. 1, WNT denotes a wireless network which comprises a wireless transmitter 104 as a control station and wireless transmitters 101 to 103 as terminal communication stations, for example. The wireless transmitters 101 to 104 include transmitting and receiving antennas, respectively.

For example, a television receiver 11 and a set top box (STB : a repeater for sending and receiving a signal between a broadcasting station and a home, a home adapter for connecting a CATV line to the television receiver to control a large number of programs, and the like) 12 are connected to the wireless transmitter 101 through a cable L1.

For example, a printer output device 13 is connected to the wireless transmitter 102 through a cable L2.

For example, a magnetic picture recording and reproducing device (VTR) 14 and a telephone set 15 are connected to the wireless transmitter 103 through a cable L3.

For example, a game machine 16 and a personal computer 17 are connected to the wireless transmitter 104 through a cable L4.

In the wireless network WNT, the wireless transmitter 104 as the control station can communicate with all the wireless transmitters 101 to 103 as the terminal communication stations. The communication station 101 cannot directly communicate with the distant communication station 103, but can communicate with the control station 104 and the communication station 102. The communication station 102 can communicate with the control station 104 and the communication stations 101 and 103. The communication station 103 cannot directly communicate with the distant communication station 101, but can communicate with the control station 104 and the communication station 102.

Figure 2:
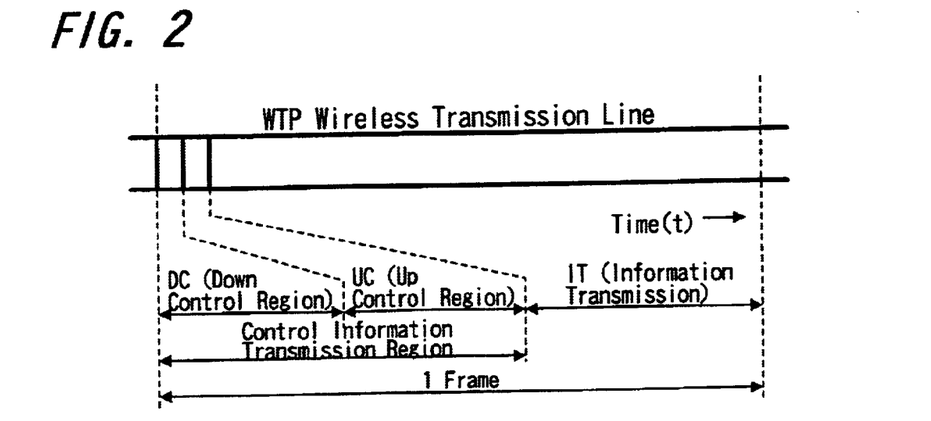
FIG. 2 is a diagram showing a wireless transmission frame of the embodiment.

FIG. 2 shows the wireless transmission frame of a signal transmitted between the communication stations (the wireless transmitters 101 to 104) in a network system as the specific example, in which a frame cycle is defined to transmit data. As shown in FIG. 2, one frame period is defined for a predetermined period of time and a predetermined section at the head of one frame period is set to be a control information transmission region in which a down control region DC and a rising control region UC are provided. Moreover, a section other than the control information transmission region of each frame is set to be an information transmission region IT, in which, various data are transmitted by utilizing the access control of the control station or the collision avoiding technique of each communication station.

Figure 3:
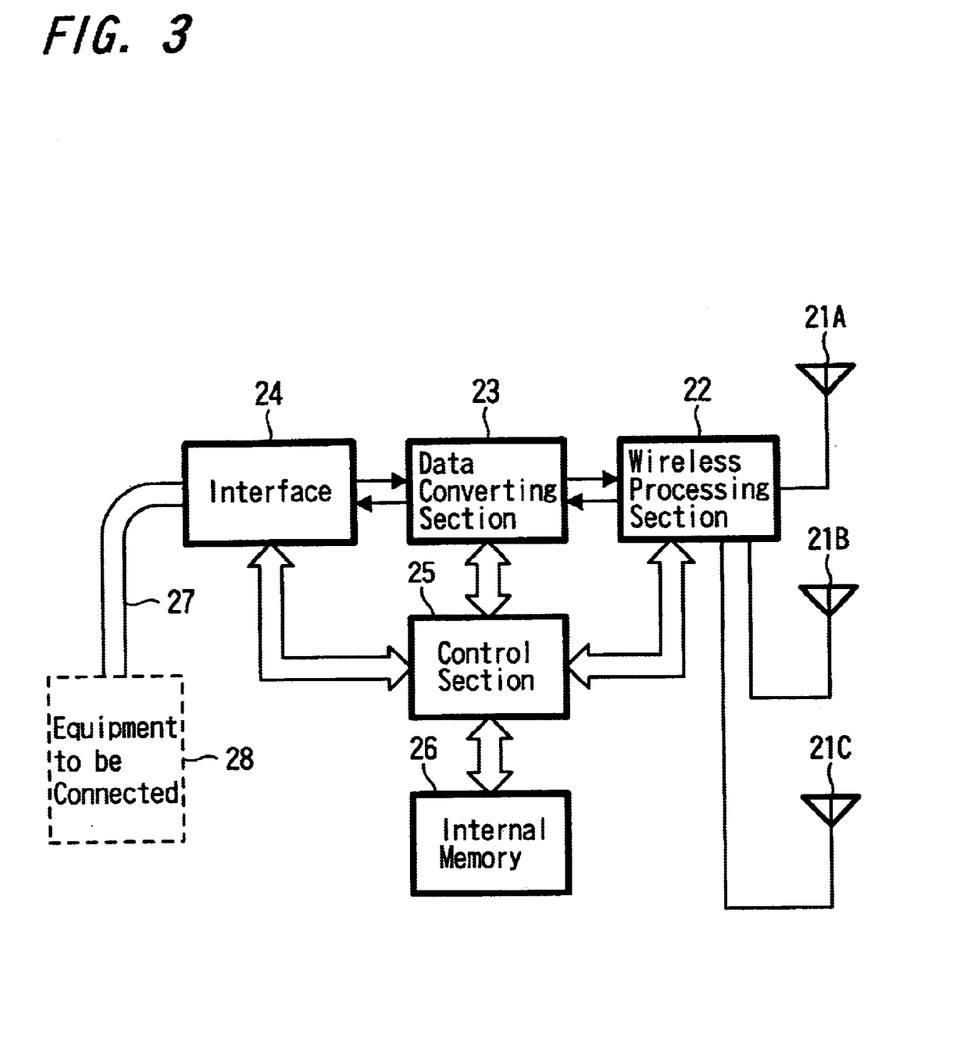
FIG. 3 is a block diagram showing a wireless transmitter of the wireless network system as the embodiment.

Referring to FIG. 3, description will be given next to an example of the structure of the wireless transmitters 101 to 104 constituting the wireless network WNT shown in FIG. 1. The wireless transmitters 101 to 104 have basically a common structure. Specifically, the wireless transmitters 101 to 104 comprise antennas 21A to 21C for transmitting and receiving and a wireless processing section 22 connected to the antennas 21A to 21C for carrying out a wireless transmission processing and a wireless reception processing, thus allowing wireless transmission between other transmitters to be performed.

A plurality of antennas 21A to 21C are herein used to make an antenna diversity structure. In other words, an optimum antenna can previously be selected to perform communication when the communication with each communication station constituting the network is to be performed.

In this case, for example, a method using a multicarrier signal which is referred to as an OFDM(Orthogonal Frequency Division Multiplex) method is employed as a transmitting method for carrying out transmission and receipt through a wire processing section 22 in the present embodiment, and a very high frequency band (for example, a 5 GHz band) is used as a frequency to be used for the transmission and the receipt, for example.

In the present embodiment, a comparatively weak output is set for a transmission output. For example, in case of indoor use the output is on such a level that it can give wireless transmission within comparatively short distance of approximately several meters to several decades meters.

There is provided a data converting section 23 for carrying out data conversion of a signal received by the wireless processing section 22 and data conversion of a signal to be transmitted by the wireless, processing section 22. The data converting section 23 performs the conversion of respective transmission packets of a wire transmission line and a wireless transmission path as well as the addition of an error correction code. The data converted by the data converting section 23 are supplied to a processor of an equipment 28 connected through the interface section 24, and the data supplied from the processor of the connected equipment 28 are supplied to the data converting section 23 through the interface section 24 so that the conversion processing can be carried out.

The external interface of the interface 24 of the wireless transmitter is herein arranged so that voice and image information or various data information can be transmitted and received to and from the connected apparatus 28 through the high-speed serial bus 27 such as IEEE 1394.

Additionally, the wireless transmitters may be built in the body of the equipment 28 to be connected.

Each section of the wireless transmitter is arranged so that processings may be executed under the control of the control section 25 constituted by a microcomputer or the like. In this case, if a signal received by the wireless processing section 22 is a control signal, the received signal is then supplied through the data converting section 23 to the control section 25 to set each section into a state indicated by the received control signal.

Moreover, it is also arranged that the control signal to be transmitted from the control section 25 to other transmitters is supplied from the control section 25 to the wireless processing section 22 through the data converting section 23 for wireless transmission.

If the received signal is a synchronous signal, the control section 25 decides the reception timing of the synchronous signal, sets up a frame cycle based on the synchronous signal and executes a communication control processing in that frame cycle.

Moreover, the internal memory 26 is connected to the control section 25 and serves to temporarily store data necessary for communication control.

Furthermore, the devices on the wireless information transmitting side sets the valid time information on the information in the cable (wire) environment fetched from the connected apparatus 28 through the high-speed serial bus 27 and the interface 24 under the control of the control section 25, and also supplies the signal received by the wireless processing section 22 to the control section 25 through the data converting section 23 if the received signal is ACK (acknowledge) information, in order to perform the resending control of the wireless packet based on the decision of the control section 25.

Moreover, the devices on the wireless information receiving side supplies the wireless packet header information of the signal received by the wireless processing section 22 to the control section 25 through the data converting section 23, acquires the valid time information and decides the validity of that information in the control section 25.

Next, an example of the conversion of wire asynchronous information using the wireless transmitting device shown in FIG. 3 will be described with reference to FIGS. 4A–4D and 5. FIG. 5 is a flow chart showing the procedure for removing an error correction code from data information in a wired environment and converting the data information into data information in a wireless environment, adding the error correction code to the data information in the wireless environment again and transmitting data information thus obtained by wireless. FIGS. 4A–4D are diagrams to be used for explaining the flow chart of FIG. 5.

Figures 4A, 4B:
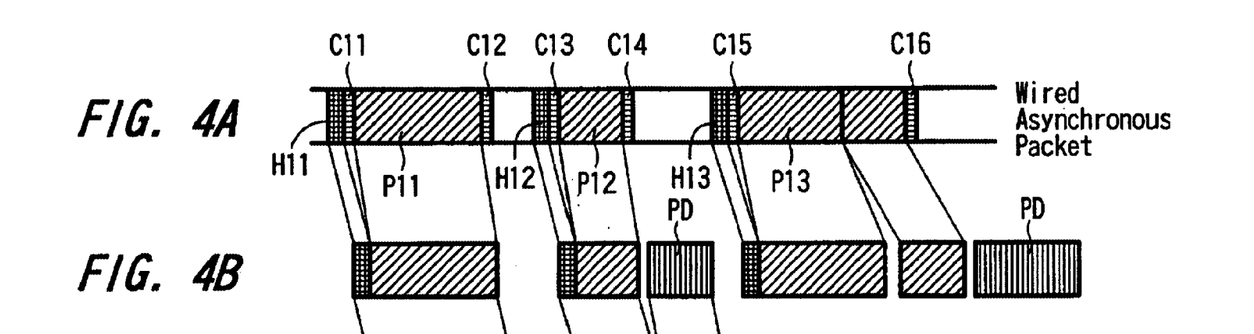
FIGS. 4A–4D are timing charts showing an example of the conversion of wired asynchronous information in the embodiment.
Figure 5:
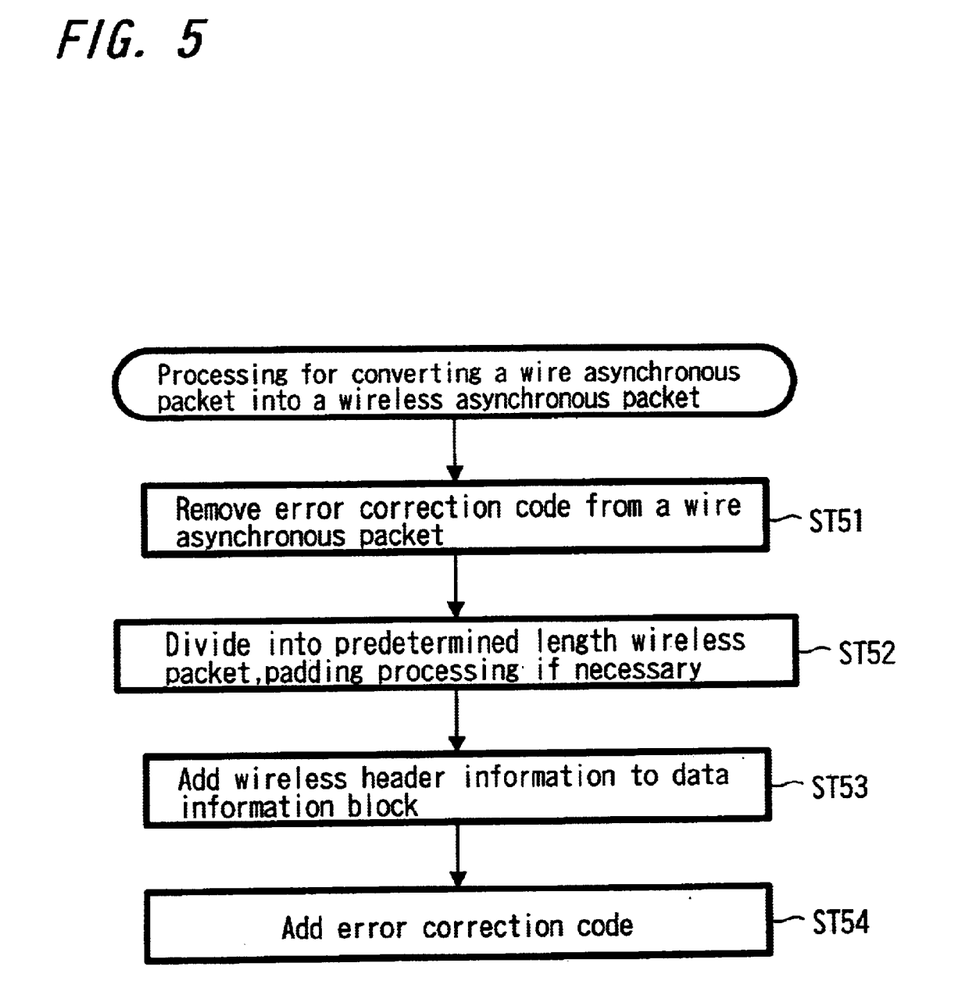
FIG. 5 is a flow chart showing a processing for converting a wire asynchronous packet into a wireless asynchronous packet according to a specific example.

FIG. 4A shows asynchronous transmission information transmitted over the high-speed serial bus. The asynchronous transmission packet herein is sequentially constituted by header information H11, a header CRC (Cyclic Redundancy Check) C11, a payload P11 and data CRC C12. In the same structure, it is shown that a short packet (which is sequentially constituted by header information H12, a header CRC C13, a payload P12 and data CRC C14) and a long packet (which is sequentially constituted by header information H13, a header CRC C15, a payload P13 and data CRC C16) are further transmitted.

At ST51 of FIG. 5, error correction code portions, that is, a header CRC and data CRC, C11 and C12, C13 and C14, and C15 and C16 are removed from each asynchronous transmission packet in FIG. 4A.

At ST52, next, information (padding) PD for zero padding a short packet is prepared to convert a transmission packet in a cable (wire) environment into a transmission packet in a wireless environment, and information (padding) PD for dividing a long packet into a plurality of wireless packets and zero padding the residual portions is also prepared.

FIG. 4B shows processings to be carried out at the ST 51 and the ST52.

At ST53, next, destination information and information inherent in the corresponding packet are added as wireless header information R21, R22, R23 and R24 to the data information blocks D21, D22, D23 and D24 of the built wireless packet.

Figures 4C, 4D:
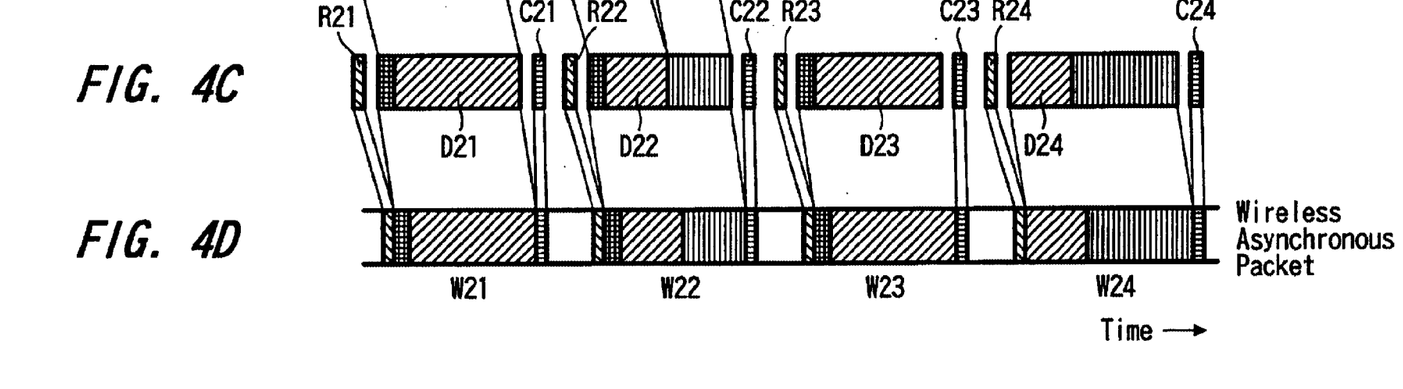

At ST54, the wireless header information are added to the data information blocks D21 to D24, and CRC information C21, C22, C23 and C24 are added as error correction codes in the wire environment thereto, respectively. The processings to be carried out at the ST53 and the ST54 are shown in FIGS. 4C and 4D. Thus, packets W21, W22, W23 and W24 for the wireless transmission shown in FIG. 4D are built. If necessary, the error correction code may be added to only the wireless header information portion. These packets W21, W22, W23 and W24 for the wireless transmission are transmitted by wireless based on a predetermined media access control method.

Next, an example of the conversion of wireless asynchronous information using the wireless transmitting device shown in FIG. 3 will be described with reference to FIGS. 6A–6D and 7. FIG. 7 is a flow chart showing the procedure for removing an error correction code from data information in a wireless environment and converting the data information into data information in a cable (wire) environment, adding the error correction code to the data information in the cable environment again and transmitting data information thus obtained by a wireless cable. FIGS. 6A–6D is a diagram to be used for explaining the flow chart of FIG. 7.

Figure 6A:
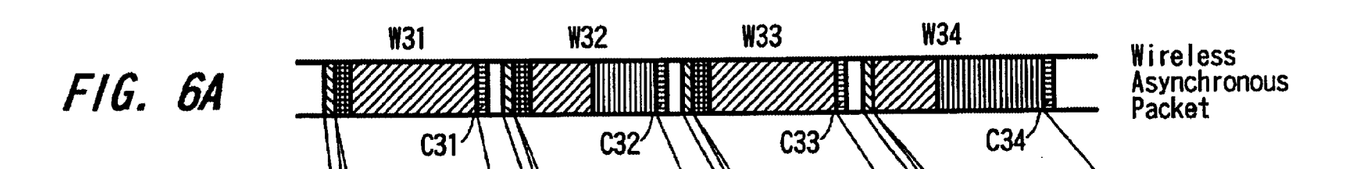
FIGS. 6A–6D are timing charts showing an example of the conversion of wireless asynchronous information in the embodiment.
Figures 6B, 6C:
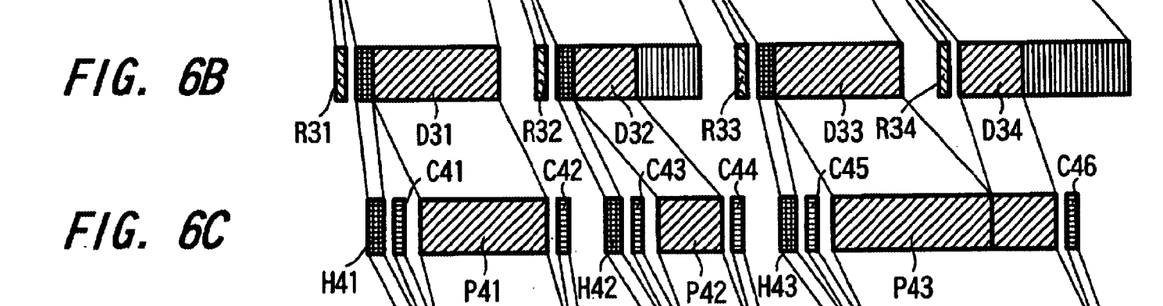
Figure 7:
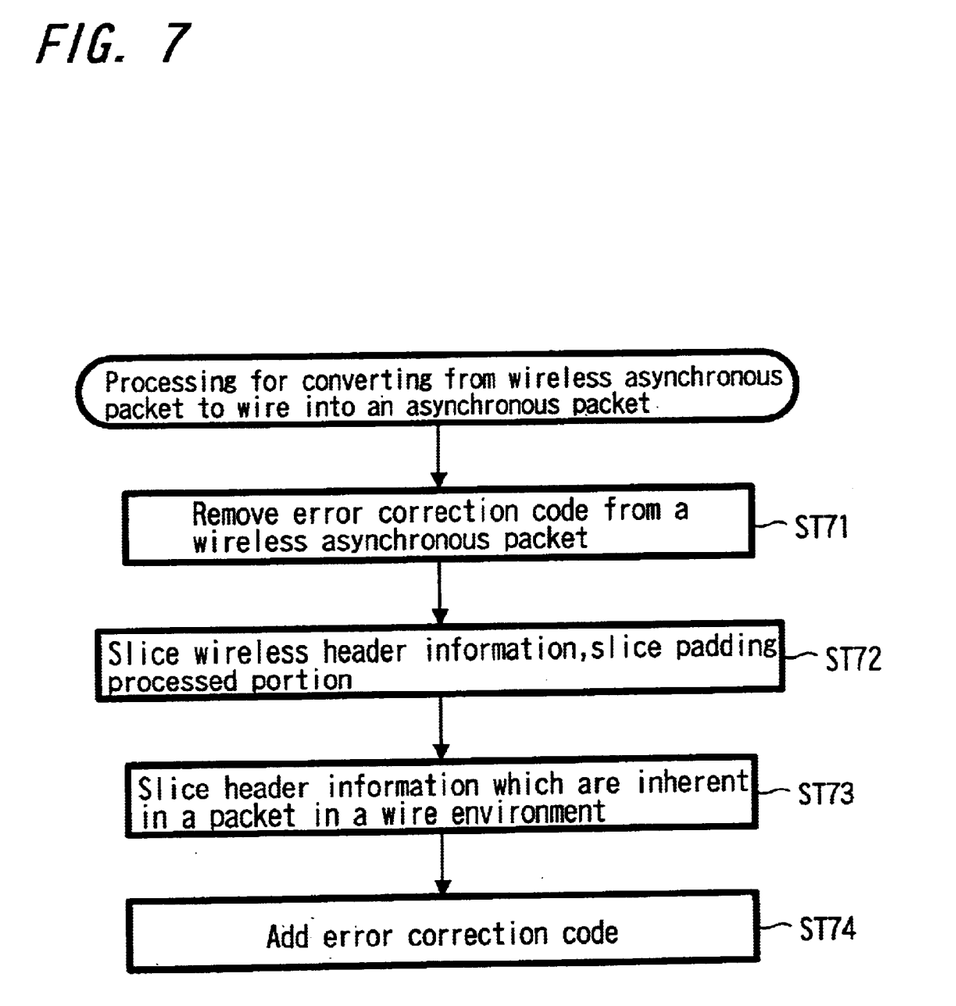
FIG. 7 is a flow chart showing a processing for converting a wireless asynchronous packet into a wire asynchronous packet according to a specific example.

FIG. 6A shows that four asynchronous packets W31, W32, W33 and W34 are transmitted by wireless. At ST71 in FIG. 7, error correction code portions C31, C32, C33 and C34 are removed from the wireless asynchronous packet in FIG. 6A. At ST72, moreover, wireless header information R31, R32, R33 and R34 are sliced from the wireless asynchronous packet and a portion zero padded by the padding processing is sliced. This state is shown in FIG. 6B.

At ST73, next, header information H41, H42 and H43 which are inherent in a corresponding packet in the wire environment are sliced (extracted), and furthermore, payload portions P41, P42 and P43 are constituted. This state is shown in FIG. 6C.

At ST74, on the other hand, CRC information C41, C42, C43, C44, C45 and C46 are individually added as the error correction codes, and a packet in a wire environment is thus built.

Figure 6D:
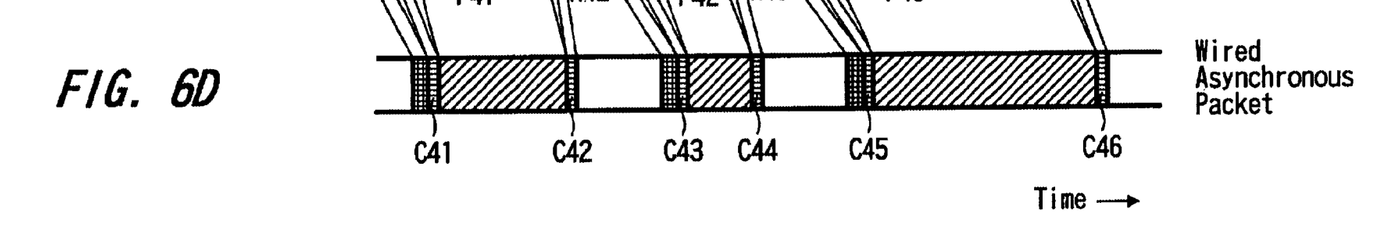

Transmission to a high-speed serial bus is carried out based on a predetermined media access control method. This state is shown in FIG. 6D.

Figure 8:
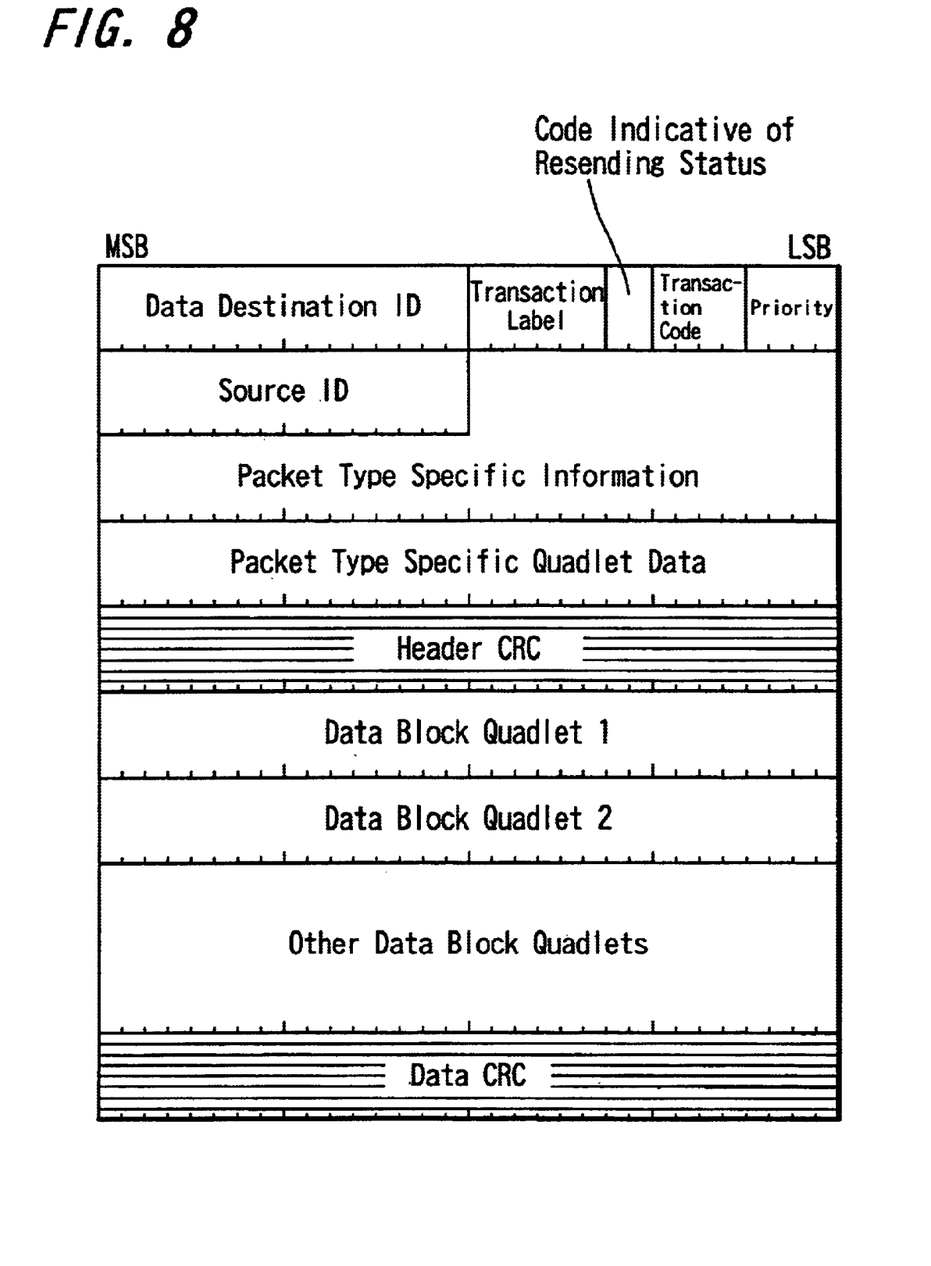
FIG. 8 is a diagram showing an example of the structure of the wired asynchronous information in the embodiment.

FIG. 8 shows an example of the structure of the asynchronous data packet to be transmitted by wire. This corresponds to the packet data for the asynchronous transfer mode in the IEEE 1394 interface format which are to be transmitted through the high-speed serial bus. Specifically, a data destination ID, a transaction label (tl), a code indicative of a resending status (rt), a transaction code (tcode), a priority (pri), a source ID, a packet type specific information, a packet type guide quadlet data (by the way, the quadlet implies data for four bytes), a header CRC (header CRC), a data block quadlet 1 which is data to be actually transmitted, a data block quadlet 2, other data block quadlets and CRC (data CRC) for the transmitted data are each arranged sequentially.

Figure 9:
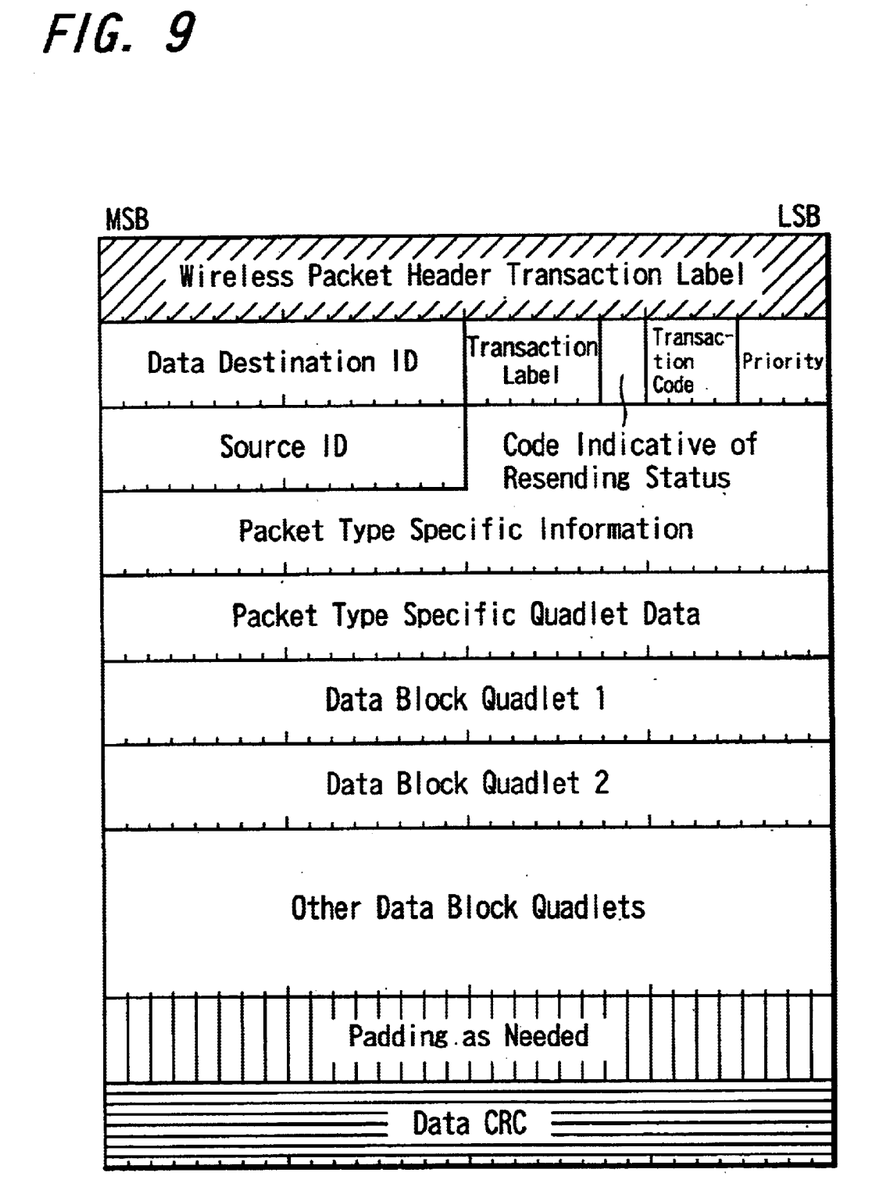
FIG. 9 is a diagram showing an example of the structure of the wireless asynchronous information in the embodiment.

FIG. 9 shows an example of the structure of an asynchronous data packet to be transmitted by wireless. This corresponds to the packet data for the asynchronous transfer mode which are to be transmitted by wireless at any optional timing. Specifically, the header CRC and data CRC portions are removed from the structure of the packet data for wired transmission shown in FIG. 8 and a wireless packet header is added to its head portion. Furthermore, a portion which does not fill the wireless packet is zerofilled (Padding) as needed, and the wireless data CRC (Wireless Data CRC) in the wireless section are added. It is also possible to use a structure in which information such as a destination ID of data can be rewritten if necessary.

Figure 10:
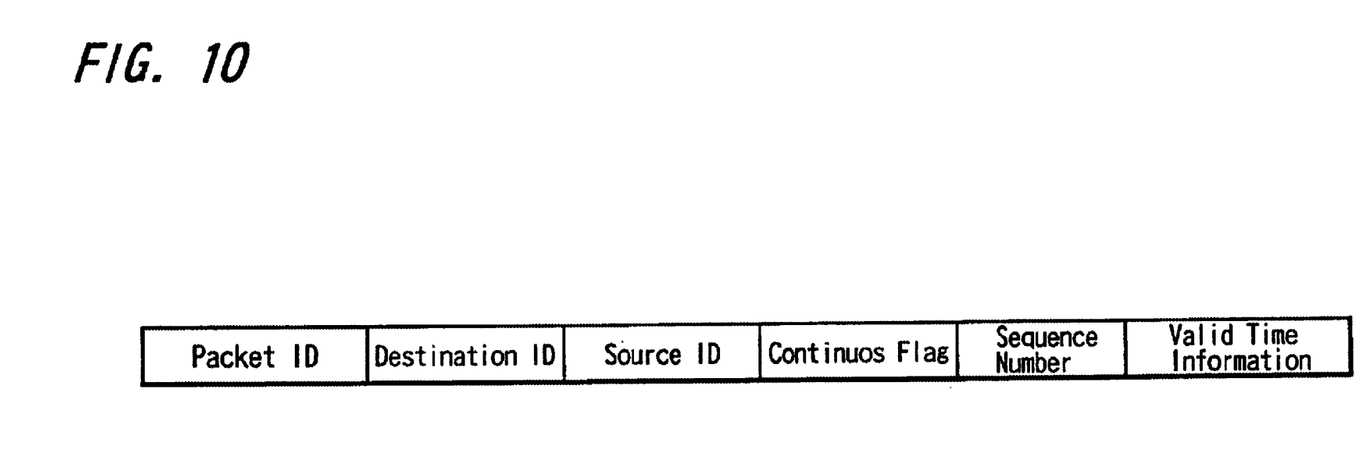
FIG. 10 is a diagram showing the structure of wireless packet header information in the embodiment.

With reference to FIG. 10, description will be given to information to be added as wireless packet header information to each wireless packet. This is constituted by a packet ID (Packet ID) indicative of the type of a packet, a destination ID indicative of a destination wireless device, a source ID indicative of a source wireless device, a continuous flag indicative of a structure using a plurality of wireless packets, a sequence number (Sequence No.) to be information inherent in each wireless packet, effective time information describing a time at which the wireless packet should be sent, and the like. A necessary parameter may be added appropriately in addition to these information.

Figure 11:
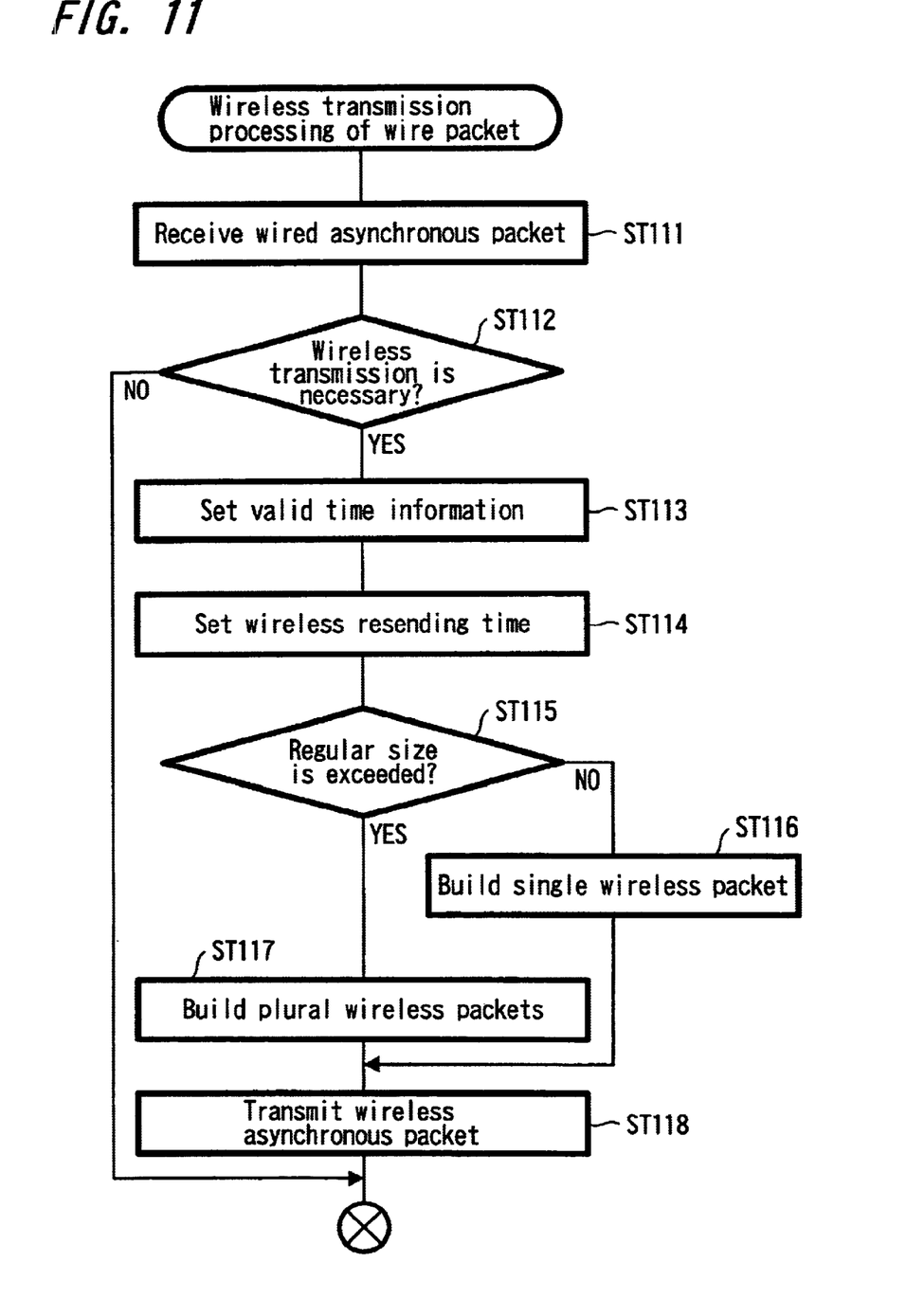
FIG. 11 is a flow chart showing the operation of the wireless transmission of a wired packet in the embodiment.

Referring to a flow chart of FIG. 11, description will be given to the wireless asynchronous transmission processing of the wired asynchronous packet. First of all, it is assumed that the wired asynchronous packet is received at Step ST111. It is decided whether or not the corresponding packet should be transmitted by wireless at Step ST112. If the wireless transmission is not required, based on the decision at the Step ST112, processings at and after Step ST113 are skipped. If the wireless transmission is required, information on valid time within which the packet should be transmitted to the destination is set up at the Step ST113.

Moreover, time information indicating a time-out of the resending of the wireless packet is also set up at Step ST114. Furthermore, it is decided whether or not a wireless transmission packet size (regular size) is exceeded at Step ST115. If the wireless transmission packet size is not exceeded, based on the decision at the Step ST115, a single wireless transmission packet is built at Step ST116. If the regular size is exceeded, a plurality of wireless packets are built at Step ST117. At Step ST118, the resulting wireless transmission packet is transmitted by wireless under the predetermined transmission control.

Figure 12:
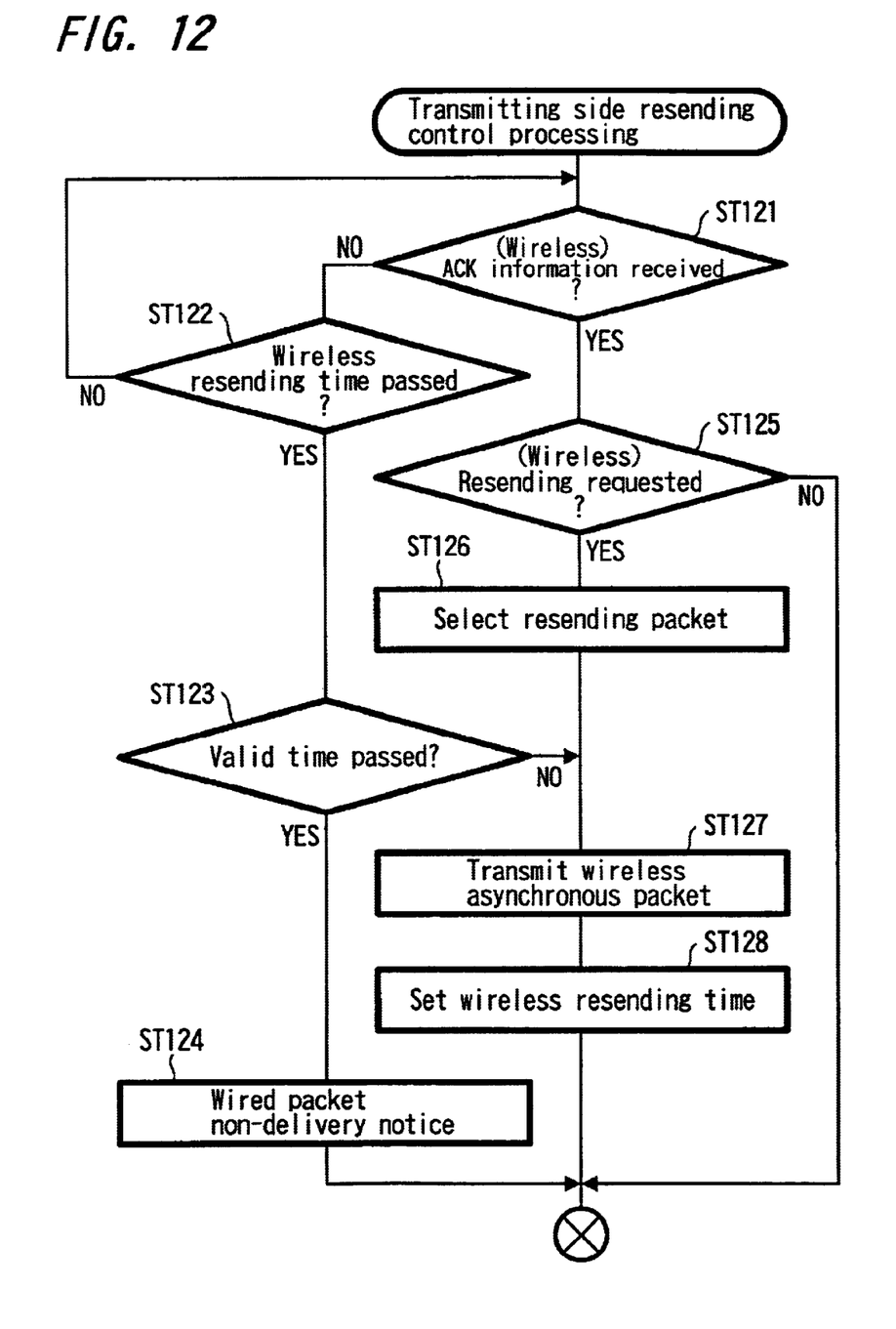
FIG. 12 is a flow chart showing the operation of the resending control of a wireless packet in the embodiment.

Referring to a flow chart of FIG. 12, a processing of controlling the resending of the wireless packet will be described next. At Step ST121, it is decided whether or not wireless ACK (acknowledge) information has been returned from a communication station of the destination. If the wireless ACK information has not been returned, based on the decision of the Step ST121, it is decided whether the wireless resending time has passed at Step ST122. If the wireless resending time has not passed or not based on the decision, the routine returns to the decision on whether the ACK (acknowledge) information has been received at Step ST121 is returned. If the wireless resending time has passed, it is decided whether the valid time has passed by referring to the valid time information at Step ST123.

If the time has not yet passed based on the decision of Step ST123, a processing of resending the wireless packet is carried out at Step ST127 in order to carry out the processing of resending all the wireless packets. If the time has already passed, a wired packet non-delivery notice is given to the device to be a transmitting source on the wired side through a wired transmission line at Step ST124.

If the ACK information has been returned based on the decision of Step ST121, the contents of the ACK information are analyzed and it is decided whether there is a packet to be retransmitted at Step ST125. If the resending is not required based on the decision at the Step ST125, processings at and after Step ST126 are skipped. In other words, it is not necessary to preserve the wireless packet for resending. If the resending is required, a wireless packet to be resent is selected at Step ST126. Subsequently, the processing of resending the wireless packet is carried out at the Step ST127. At Step ST128, furthermore, time out time information before the resending of the wireless packet is set at step ST128.

Figure 13:
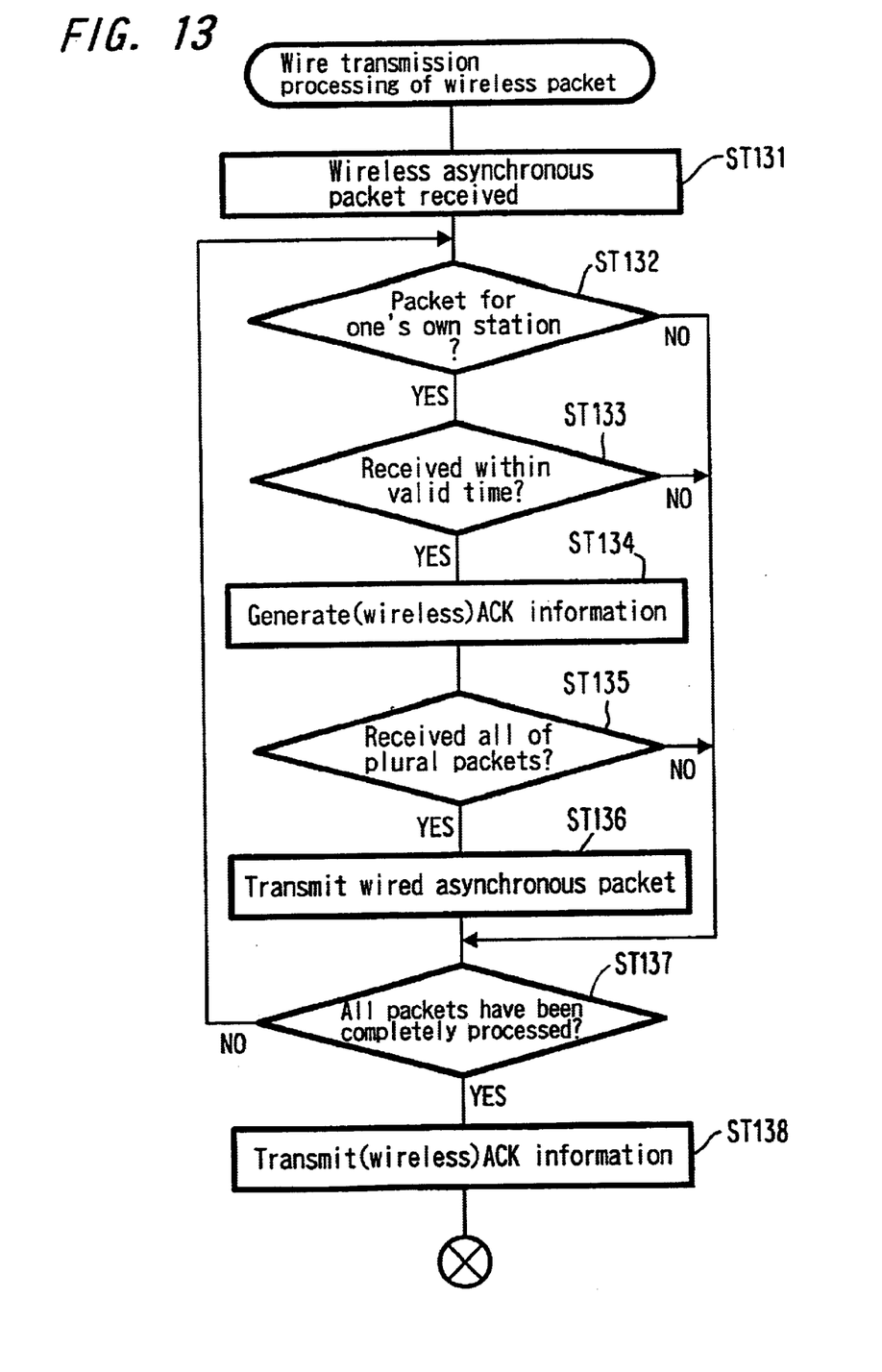
FIG. 13 is a flow chart showing the operation of the wired transmission of the wireless packet in the embodiment.

Referring to a flow chart of FIG. 13, description will be given to a processing of transmitting a wireless asynchronous packet as a wired asynchronous packet. At Step ST131, the wireless asynchronous packet is received by the transmission frame associated with predetermined wireless transmission. First of all, it is decided whether or not the packet is directed to one's own station at Step ST132. If the packet is not directed to its own station based on the decision of Step ST132, the routine proceeds to Step ST137 where the next processing is determined. If the packet is directed to its own station, it is decided whether or not the packet has been received within a valid time by referring to the valid time information of the wireless packet at Step ST133.

If the valid time has passed based on the decision at Step ST133, the wireless packet is erased and the routine proceeds to Step ST137 where the next processing is determined. If the valid time is not exceeded, the reception ACK (acknowledge) information of the corresponding wireless packet is generated at Step ST134.

Subsequently, at Step ST135, it is decided whether or not all the information constituted by a plurality of wireless packets are received. A confirming method using continuous flag, etc. which is described on the wireless packet header will be suitable for the decision, for example. If all the plurality of wireless packets are not complete, the wireless packets are preserved and the routine then proceeds to Step ST137 where the next processing is determined. If all the plurality of wireless packets are complete or a single wireless packet is received, the wired asynchronous packet is built and transmitted on the wired transmission line at Step ST136.

Subsequently, at the Step ST137, it is decided whether or not all the processings of receiving the wireless asynchronous packet which is collectively received by the transmission frame concerning the predetermined wireless transmission are completed. If all the packets are not completely processed, the routine returns to Step ST132 where the next wireless packet is continuously processed. If all the packets are completely processed, the reception ACK (acknowledge) information of the wireless packet is returned to the communication station of transmission source at Step ST138. Thus, a series of processings come to an end. On this occasion, if the wireless packet is not received and there is no reception ACK (acknowledge) information of the wireless packet, it is not necessary to return the packet.

Figure 14:
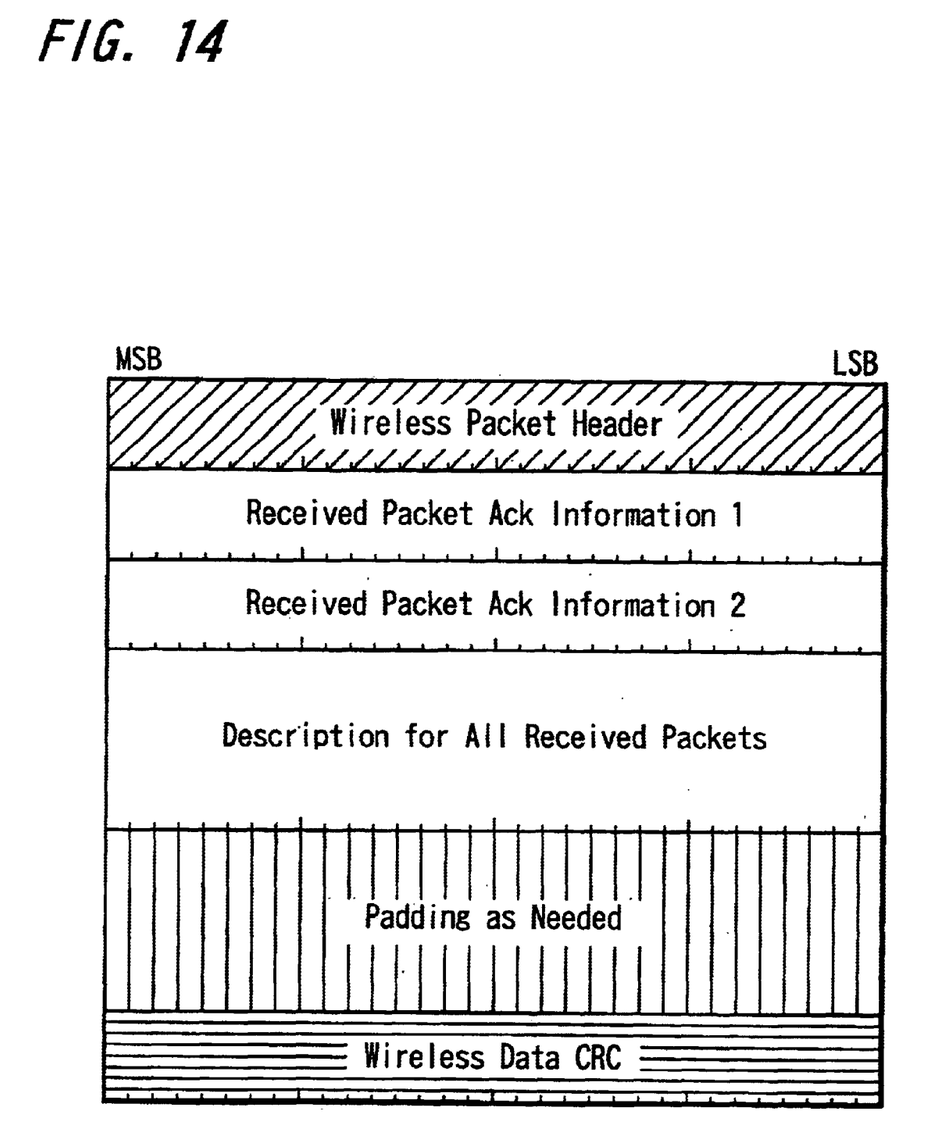
FIG. 14 is a diagram showing an example of the structure of a wireless ACK return packet in the embodiment.

Referring to FIG. 14, description will be given next to an example of the structure of the wireless ACK return packet at Step ST-138 in the wired transmission of the wireless packet shown in FIG. 13. This packet is constituted by the wireless packet header, received packet ACK information 1, received packet ACK information 2, description for all the received packets zerofilling (padding) as needed, and wireless data CRC.

According to the present invention, the redundant portion of the data information transmitted through the high-speed serial bus is removed and the error correction code for the wireless transmission is added to a necessary information portion. Therefore, the wireless transmission data information can be simplified and can be efficiently transmitted by wireless.

According to the present invention, moreover, the information necessary for the wire transmission is fetched from the data information transmitted through the wireless transmission path and the error correction code for the wire transmission is added at each time. Therefore, the contents of the packet thus transmitted can be modified easily and the transmission data information can be constituted efficiently.

According to the present invention, furthermore, the effective time of the data information is set on the transmitting side of the wireless transmission so that it is possible to carry out the wireless transmission in which a time required for retransmitting the data information can be decided and the wire side can be informed of the fact that the transmission cannot be carried out due to an unstable connection between the wireless transmitting devices. Moreover, in the case in which the retransmission is carried out necessary times and the effective time is passed, it is possible to carry out the wireless transmission capable of discarding the wireless packet.

According to the present invention, furthermore, reference is made to the valid time information of the data information on the receiving side of the wireless transmission. Therefore, it is possible to obtain a wired transmitting method capable of making invalid of the wireless data information having a valid time passed, so that no transmission to the wired transmission line can be performed.

Having described preferred embodiments of the present invention with to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A wireless transmitting method for converting data information transmitted from an apparatus connected through a wired transmission path into wireless data information and for transmitting the wireless data information, comprising the steps of:

removing an error correction code added to the data information;

converting the data information into predetermined wireless data information;

adding header information to the predetermined wireless data information converted in the step of converting; and adding the error correction code removed in the step of removing to the predetermined wireless data information to be transmitted over a wireless transmission path.

2. The wireless transmitting method according to claim 1, wherein the step of converting includes dividing long data information into a plurality of portions and subjecting short data information to a padding processing, thereby converting the data information into wireless data information having a predetermined length.

3. The wireless transmitting method according to claim 1, further comprising the step of providing the header information to include destination information indicative of a destination of the wireless data information.

4. The wireless transmitting method according to claim 1, further comprising the step of providing the header information to include effective time information describing a time at which the wireless data information is to be sent.

5. The wireless transmitting method according to claim 1, wherein the wireless transmitting step includes adding an error correction code to each of the predetermined wireless data information and the header information to be transmitted by the wireless method.

6. The wireless transmitting method according to claim 1, further comprising the step of providing the wire transmission path as a high-speed serial bus.

7. A wire transmitting method for converting data information received by wireless transmitting means into wired data information and for transmitting the wired data information, comprising the steps of:

removing an error correction code added to the data information;

converting the data information into predetermined wired data information by extracting wired header information from the predetermined wired data information converted in said step of converting; and adding the error correction code to the predetermined wired data information and transmitting the summed information to an apparatus connected through a wired transmission path.

8. The wired transmitting method according to claim 7, further comprising the step of providing the wire transmission path as a high-speed serial bus.

9. The wire transmitting method according to claim 7, wherein the converting step includes slicing wireless header information from the data information and a padding processed portion when present.

10. The wired transmitting method according to claim 9, wherein the converting step comprises including effective time information in the wireless header information and converting the data information into predetermined wire data information only when the effective time information is valid.

11. A wireless transmitting apparatus for converting data information transmitted from an apparatus connected through a wired transmission path into wireless data information and for transmitting the wireless data information, comprising:

converting means for removing an error correction code added to the data information and for converting the data information into predetermined wireless data information adding means for adding header information to the predetermined wireless data information converted by the converting means; and transmitting means for adding the error correction code to the predetermined wireless data information to be transmitted over a wireless transmission path.

12. The wireless transmitting apparatus according to claim 11, wherein the converting means includes means for dividing long data information into a plurality of portions and for carrying out a padding processing on short data information in order to convert the data information into wireless data information having a predetermined length.

13. The wireless transmitting apparatus according to claim 11, wherein the header information includes destination information indicative of a destination of the wireless data information.

14. The wireless transmitting apparatus according to claim 11, wherein the header information includes effective time information describing a time at which the wireless data information is to be sent.

15. The wireless transmitting apparatus according to claim 11, wherein the wireless transmitting means includes means for adding an error correction code to each of the predetermined wireless data information and the header information to be transmitted by wireless.

16. The wireless transmitting apparatus according to claim 11, wherein the wired transmission path is a high-speed serial bus.

17. A wired transmitting apparatus for converting data information received by wireless transmitting means into wire data information and for transmitting the wired data information, comprising:

converting means for removing an error correction code added to the data information and for converting the data information into predetermined wired data information means for extracting wired header information from the predetermined wired data information converted by the converting means; and means for adding the error correction code to the predetermined wired data information and transmitting the summed information from the means for adding to an apparatus connected through a wired transmission path.

18. The wired transmitting apparatus according to claim 17, wherein the wired transmission path is a high-speed serial bus.

19. The wired transmitting apparatus according to claim 17, wherein the converting means includes means for slicing wireless header information from the data information and for slicing a padding processed portion when present.

20. The wired transmitting apparatus according to claim 19, wherein the converting means includes means for referring to effective time information included in the wireless header information and for converting the data information into predetermined wire data information only when the effective time information is valid.

* * * * *